United States Patent
Gruenewaelder et al.

[11] Patent Number: 5,278,223
[45] Date of Patent: Jan. 11, 1994

[54] UNIVERSAL ADHESIVE SURFACER/FILLER

[75] Inventors: Bernhard Gruenewaelder, Meerbusch; Bernhard Parent; Hermann Kluth, both of Duesseldorf; Juergen Wegner, Duesseldorf-Oberkassel; Werner Haller, Erkrath, all of Fed. Rep. of Germany

[73] Assignee: Henkel Kommanditgesellschaft auf Aktien, Duesseldorf, Fed. Rep. of Germany

[21] Appl. No.: 844,569

[22] PCT Filed: Sep. 14, 1990

[86] PCT No.: PCT/EP90/01581

§ 371 Date: Mar. 27, 1992

§ 102(e) Date: Mar. 27, 1992

[87] PCT Pub. No.: WO91/04998

PCT Pub. Date: Apr. 18, 1991

[30] Foreign Application Priority Data

Sep. 27, 1989 [DE] Fed. Rep. of Germany ....... 3932171

[51] Int. Cl.$^5$ ............................................. C08L 75/04
[52] U.S. Cl. .................................... 524/502; 524/568; 524/590; 524/851; 524/871; 524/875; 524/425; 524/427; 525/123; 528/49; 528/74.5; 156/60; 156/307.3
[58] Field of Search ............... 524/502, 568, 590, 851, 524/871, 875, 425, 427; 525/123; 528/49, 74.5; 156/60, 307.3

[56] References Cited

FOREIGN PATENT DOCUMENTS 0259722 3/1988 European Pat. Off. .

*Primary Examiner*—Maurice J. Welsh
*Attorney, Agent, or Firm*—Ernest G. Szoke; Wayne C. Jaeschke; Norvell E. Wisdom, Jr.

[57] ABSTRACT

The invention relates to optionally solventless two-component polyurethane surfacers containing finely divided fillers in a high pigment volume concentration based on a polyfunctional isocyanate component (B) and a polyol component (A) which is liquid at room temperature and which consists of mixture components containing isocyanate-reactive hydroxyl groups with an at least predominant content of branched-chain polyols (A1) containing ester and ether groups, which contains at least a proportion of the finely divided fillers and, optionally, the additives and which, for application, is mixed with the isocyanate component (B) and applied as a mixture which can still be processed by shaping. To form a substantially waterproof, elastic multipurpose adhesive surfacer which combines high adhesive strength with high volume stability, the polyol component (A) contains oleopolyols having an OH functionality of at least 2 to about 3 as an additional mixture component (A2) and, if desired, low-viscosity monofunctional alcohols of distinctly oleophilic character, which are at least substantially involatile at room temperature, in admixture with component (A1) as another additional mixture component (A3).

20 Claims, No Drawings

UNIVERSAL ADHESIVE SURFACER/FILLER

BACKGROUND OF THE INVENTION

1. Field of the Invention

This invention relates to optionally solventless two-component polyurethane surfacers containing finely divided fillers in a high pigment volume concentration based on a polyfunctional isocyanate component (B) and a polyol component (A) which is liquid at room temperature and which consists of mixture components containing isocyanate-reactive hydroxyl groups with an at least predominant content of branched-chain polyols (A1) containing ester and ether groups, which contains at least a proportion of the finely divided fillers and, optionally, the additives and which, for application, is mixed with the isocyanate component(B) and applied as a mixture that can still be processed by shaping. The present invention also relates to the use of the surfacers according to the invention.

2. Statement of Related Art

In practice, various surfacers or filling materials are used for repairing structural components of a variety of materials where losses of material have to be replaced. These surfacers or filling materials differ according to the type of binder used. Aqueous polymer dispersions, two-component epoxy resins, two-component polyurethane systems, two-component polyester systems and oxidatively crosslinking oil or alkyd resins are typically used for surfacers of the type in question. Unfortunately, surfacers of this type show inadequate adhesive properties, particularly if the thickness of the joint is of the order of one tenth of a millimeter or more. In addition, they are extremely vulnerable to cracking on account of different expansion coefficients in relation to the material to be repaired and tend to separate or even crack in the event of temperature fluctuations in the flank region.

On the other hand, there are several adhesives, partly based on the binders already mentioned, which—although suitable for joining substrates—can only be used with considerable limitations, if at all, as filling materials. Thus, polyvinyl acetate glues for example are mainly used for bonding wood and wood materials. However, the use of these adhesives presupposes an exact fit of the joint. Gaps cannot be filled with these adhesives, inter alia on account of their considerable shrinkage. In addition, phenol-resorcinol resins are used to a limited extent; although they can readily be filled, they are not suitable as proper surfacers.

Moisture-curing one-component polyurethane systems are also being used to an increasing extent. These products show more or less pronounced foaming and, by virtue of this increase in volume, have gap-filling properties, but are not suitable as surfacers because the necessary strengths cannot be reached on account of the foam structure, besides which the rheology of these systems is generally such that adequate firmness, for example on vertical surfaces, cannot be achieved.

Generally, it may be said that, in contact to adhesives, surfacers have a higher ratio of fillers to binder (pigment volume concentration, PVC), inter alia to avoid high shrinkage. If these surfacers predominantly contain inorganic fillers, they are generally difficult to machine with the tools normally used, for example by grinding, sawing, drilling, etc., and cause heavy tool wear. The effect of the high pigment volume concentration is that, in general, surfacers of the type in question are not good adhesives.

In the woodwork field, there is some incentive to develop filling surfacers having improved adhesive properties, for example based on epoxy resins, as described in DE 26 06 138. In addition, products based on a two-component polyurethane system are available on the market, but are attended by a number of significant disadvantages, beginning for example with poor handling properties during stirring of the two components, i.e., the mixture is very difficult to homogenize. In addition, many products cannot be spread out to thin layers over a homogeneous, non-porous surface. In addition, firmness on vertical or overhead surfaces is inadequate and/or curing is accompanied—through the evolution of $CO_2$, which in one case is probably caused by reaction of the isocyanate component with the residual moisture in the wood chips present as filling material—by an unwanted increase in volume which, in addition, seriously impairs internal strength through the porous foam structure formed. On the other hand, $CO_2$ can be formed in undesirably large amounts by reaction with ambient and/or substrate moisture, even when NCO groups are present in a distinct stoichiometric excess, i.e., when the isocyanate component is heavily overdosed. Products such as these are no solution to the problem in cases where losses of material, for example from wood or wood components, have to be replaced and, at the same time, high strength requirements have to be satisfied, as in the repair of broken hinges on doors or in the replacement of heavily stressed components which have been destroyed or functionally impaired by rotting, fungal attack, corrosion, material fatigue or the like. Polyurethane surfacers are not normally used for special substrates, such as metals.

The above-mentioned wood surfacers based on two-component polyurethanes may be produced, for example, from polyether polyols filled with sawdust or wood chips as the polyol component (A) and a polyfunctional isocyanate component (B), for example diphenyl methane diisocyanate (MDI). Processability is often impaired on account of the high filler content and/or the size of the filler particles.

To sum up, it may be said that the various requirements which an adhesive compound on the one hand and a surfacer on the other hand have to meet in one and the same product have not hitherto been satisfied without serious restrictions. Accordingly, there is still a need in industry, commerce, and the workshop for multipurpose products on the one hand, i.e., products which can be used for filling or bonding, and on the other hand for products having wider potential applications, i.e., filling and bonding, as required for example for the replacement of material in heavily stressed structural components.

DESCRIPTION OF THE INVENTION

Object of the Invention

Accordingly, the problem addressed by the present invention is to provide a multipurpose surfacer which does not have the above-described disadvantages of hitherto known adhesive surfacers, but instead combines the described positive properties of fillers on the one hand and adhesives on the other hand, including
  high water resistance (in the case of wood materials, at least B3 according to DIN 68 602)
  high heat resistance high bond strength, particularly in the flank region
high volume stability
high pigment volume concentration
high elasticity
good processability in a layer thickness of up to several centimeters
firmness during processing and curing
a smooth, compact surface structure
good machinability of the cured material by any machining methods
coatability with any commercially available paint systems
high affinity for pigments.

SUMMARY OF THE INVENTION

The technical solution to this problem starts out from optionally solventless two-component polyurethane surfacers, containing finely divided fillers in a high pigment volume concentration, that are based on a polyfunctional isocyanate component (B) and a polyol component (A) which is liquid at room temperature and which consists of mixture components containing isocyanate-reactive hydroxyl groups with an at least predominant content of branched-chain polyols (A1) containing ester and ether groups, which contains at least a proportion of the finely divided fillers and, optionally, the additives and which, for application, is mixed with the isocyanate component (B) and applied as a mixture which can still be processed by shaping. The invention is characterized in that, to form a substantially waterproof, elastic multipurpose adhesive surfacer which combines high bond strength with high volume stability, the polyol component (A) contains oleopolyols having an OH functionality of at least 2 to about 3 as an additional mixture component (A2) and, if desired, low-viscosity monofunctional alcohols of distinctly oleophilic character, which are at least substantially involatile at room temperature, in admixture with component (A1) as another additional mixture component (A3).

Reactive adhesive systems based on polyhydroxy compounds or polyol compound and polyfunctional isocyanates are known as two-component polyurethane binders in modern adhesive technology. Two-component polyurethane systems of this type are also used as binders for surfacers normally containing finely divided fillers in a high pigment volume concentration. If desired, surfacers of the type in question can also be solvent-free. In this case, the polyol component (A) is liquid at room temperature for reasons of processability and consists of branched-chain polyols (A1) containing ester and ether groups and, optionally, small quantities of other mixture components containing isocyanate-reactive hydroxyl groups. These other mixture components may be, for example, polyester polyols and/or polyether polyols. In addition, the polyol component (A) in the case of surfacers contains at least a proportion of the finely divided fillers and, optionally, the additives. For application, the polyol component (A) is mixed with the isocyanate component (B) and applied as a mixture which can still be processed by shaping. (A) and (B) are also known as reactive components.

The polyols (A1) containing ester and ether groups, so that they are also known as polyether/polyester polyols, are selected because they combine the advantages of polyester polyols with the advantages of polyether polyols. In adhesive systems of the type in question, the polyester groups are known to be responsible for high adhesion to the substrates to be bonded. The disadvantage is that polyester groups increase viscosity, thus making low-viscosity, readily processable adhesive surfacers difficult to formulate. This applies in particular when relatively large quantities of fillers are present, as necessary for example for obtaining firm surfacers. In contrast to polyester polyols, polyether polyols show distinctly lower viscosities for similar molecular weights. The disadvantage is that polyether groups are particularly hydrophilic, with the result that adhesive systems of this type readily absorb water from the air and/or from the substrate during production, storage and/or processing. Accordingly, porous adhesive films can be formed during the curing process, so that cohesion is reduced. In this case, therefore, branched-chain polyols (A1) containing ester and ether groups develop properties which, although optimal in terms of application, still do not satisfy the stringent requirements mentioned above for multipurpose adhesive surfacers.

Accordingly, to form a substantially waterproof, elastic multipurpose adhesive surfacer according to the invention, which combines high bond strength with high volume stability, the polyol component (A) contains oleopolyols having an OH functionality of at least 2 to about 3 as a further mixture component (A2) and, optionally, low-viscosity monofunctional alcohols of distinctly oleophilic character, which are at least substantially involatile at room temperature, in admixture with the polyols (A1) as a further mixture component (A3).

DESCRIPTION OF THE PREFERRED EMBODIMENTS

Since the polyol component (A) is liquid at room temperature in the interests of good processability, but since on the other hand the adhesive surfacer has to remain firm, polyols (A1) having a viscosity in the range from about 3,000 to 5,000 mPas at 20° C. are preferred. For safety reasons, it may be preferred to use polyols (A1) having a flashpoint above 200° C. To obtain a surfacer of adequate strength, the polyols (A1) in one particular embodiment have an OH value of 120 to 200 and preferably of 165±5 for an average functionality of about 2.4 to 2.6.

It can be particularly advantageous if, in this case, the polyols (A1) have an average equivalent weight of 300 to 380. In one preferred embodiment of the polyols (A1), the number of ester groups present is selected so that a saponification number of 145±5 is obtained. In conjunction with the isocyanate component (B), polyols (A1) such as these in the viscosity and functionality range mentioned lead to polyurethanes which, as a constituent of the surfacer, are adequately crosslinked and, hence, are responsible for the inner cohesion and for a certain hardness and are not too brittle. In addition, they are substantially water-repellent, i.e., are not affected by moisture, and are available on the market as commercial products, for example under the names Sovermol ® POL 1080 V (Henkel KGaA) and Demophen ® 1150 (Bayer AG).

To obtain an adhesive surfacer which is substantially waterproof, it is preferred to use polyols or mixture components (A1), (A2), and (A3) which are at least predominantly oleophilic or hydrophobic, i.e., water-repellent. Accordingly, oleopolyols having an OH functionality of at least 2 to about 3 are present as an additional mixture component (A2).

Oleopolyols or even oleochemical polyols are generally understood to be polyols which have produced from natural oils and fats. In view of the shortage of petroleum resources, one of their advantages is that they can be produced from renewable raw materials. In special cases, it may even be preferred to use reaction products of epoxidized fats with alcohols as the oleochemical polyols.

Preferred oleopolyols are glycerol esters of long-chain fatty acids which are at least predominantly OH-substituted. As known to one of ordinary skill in the art, fatty acid glycerol esters such as these may be classified as particularly oleophilic or hydrophobic. In the interests of better processability, fatty acid glycerol esters which are liquid at room temperature are selected for the purposes of the invention. The fatty acids of the fatty acid glycerol esters may optionally be at least partly olefinically unsaturated.

In one particular embodiment, castor oil is present as component (A2). A castor oil having an OH value of 165±5 for an OH functionality of 2.5 to 3 is preferred. To avoid unwanted $CO_2$ formation through any water possibly present during the subsequent reaction with isocyanates, the castor oil is preferably steamed and dehydrated. Castor oil of the above-mentioned specification has a viscosity in the range from 950 to 1,100 mPas and, in admixture with the polyols (A1), contributes towards reducing the viscosity and, hence, improving the processability of the mixture. In addition, castor oil is totally insoluble in water, i.e., is highly hydrophobic, and has a flash point above 250° C. Castor oil counteracts embrittlement of the cured adhesive surfacer. In one preferred embodiment, the castor oil has an OH functionality of about 2.7.

According to the invention, low-viscosity monofunctional alcohols of distinctly oleophilic character, which are at least substantially involatile at room temperature, are optionally present as another additional mixture component (A3) in the polyol component (A). The viscosity of the polyol component (A) inter alia may be adjusted through the content of monofunctional alcohols. Accordingly, alcohols (A3) which have a viscosity of 30 to 250 mPas and preferably of 50 to 150 mPas at 20° C. are preferred. Since, as stated above, these alcohols should have a distinctly oleophilic character and, in addition, must be at least substantially involatile, branched alcohols containing at least 8 carbon atoms are preferred. Since the oleophilic character and the low volatility increase with increasing chain length, branched alcohols containing at least 12 carbon atoms, but especially those containing at least 16 carbon atoms are particularly preferred.

The quantity and nature of component (A3) optionally present also influence the elasticity of the cured adhesive surfacer. In a preferred embodiment, therefore, branched aliphatic alcohols having OH values of from about 160 to 200 are present as (A3). Particularly favorable results are obtained with 2-octyl-1-dodecanol, more particularly in the form of technical Guerbert alcohol, which therefore represents a particularly preferred variant. This alcohol is distinguished by its low volatility and excellent stability to oxidation and has a viscosity of approximately 60 mPas at 20° C. Another advantage of these alcohols is that they show a similar effect to plasticizers, for example alkyl sulfonic acid esters, but in contrast are not washed out over a period of time because they are firmly incorporated by reaction and thus provide the cured adhesive surfacer with permanent elasticity.

As already mentioned, the performance properties of the adhesive surfacer are determined not only by the nature of components (A1), (A2), and (A3), but also by the ratio in which they are mixed in the polyol mixture (A). A mixing ratio (parts by weight) of (A1) to (A2) in the range from 10:1 to 5:1 gives particularly good results and is therefore preferred. In one particular embodiment, the preferred ratio of (A1) to (A2) is from 7:1 to 8:1. Where the monofunctional alcohols (A3) optionally used are present, particularly good results can be obtained in regard to the processability and elasticity of the wood adhesive surfacer if the mixing ratio (in parts by weight) of the sum of (A1)+(A2) to (A3) is in the range from 90:10 to 99:1. A particularly preferred mixing ratio of ((A1)+(A2)) to (A3) is in the range from 95:5 to 97:3.

To establish and optimize certain applicational parameters, such as pot life, viscosity, cure time, degree of crosslinking and elasticity, not only is the ratio of the polyol components to one another of importance, the ratio of the polyol component (A) to the isocyanate component (B) and also the choice of a suitable isocyanate component are of equal importance. Preferred isocyanate compounds are aliphatic diisocyanates and/or aromatic diisocyanates. The aliphatic compounds may even be monocyclic or polycyclic. In one particular embodiment, polyfunctional isocyanates, more particularly with a functionality of about 2.0 to 2.6, are used as the reactive component (B). Polyfunctional isocyanates having a functionality of 2.3 to 2.5 are particularly preferred. In addition to tolylene diisocyanate, diphenyl methane-4,4'-diisocyanate (MDI) is a preferred representative of the aromatic isocyanate compounds. Technical diphenyl methane diisocyanate with an isomer mixture of diisocyanates of relatively high functionality, in which it forms the principal component, is particularly suitable. Technical MDI of this type preferably has an NCO content of approximately 31% by weight. Xylylene diisocyanate and a number of aliphatic isocyanates having a functionality of 2 or more may also be used for special applications. Isophorone diisocyanate and dicyclohexyl methane diisocyanate are suitable as cyclic aliphatic diisocyanates. Aliphatic straight-chain diisocyanates, of the type obtained by phosgenation of diamines, for example tetramethylene diisocyanate or hexamethylene diisocyanate, may also be used. Oligomerized diisocyanates, so-called isocyanurates, are also suitable.

The quantities of reactive component (A) and (B) preferably present in the adhesive surfacer in accordance with the invention form a molar ratio of NCO to OH groups of 100:100 to 110:100. Particularly good results are obtained with small excesses of NCO groups. Accordingly, a molar ratio of NCO to OH groups of 104:100 to 106:100 is particularly preferred.

As already mentioned, surfacers in contrast to adhesives generally have a relatively high ratio of fillers to binder (pigment volume concentration). To achieve particularly high volume stability, the fillers which are at least partly present in the polyol component (A) have to be optimally adapted in terms of quantity to the corresponding quantity of polyol component (A). According to the invention, the preferred filler content is 40 to 70% by weight and, more particularly, 50 to 60% by weight, based on the sum of polyol component (A) plus fillers.

In the interests of better processability, the filler mixture contains at least a percentage of globular particles based on glass and/or plastics. Globular particles such as these have a so-called ball bearing effect. This effect not only makes the two reactive components very much easier to mix just before application, it also makes the stirred surfacer according to the invention considerably easier to handle. Thus, considerably weaker shear forces are required, for example, to spread, knife, or draw out the multipurpose adhesive surfacer to thin layers than in the case of a similar adhesive surfacer containing only non-globular particles. This is known to one skilled in the art as increased flexibility of the surfacer. Accordingly, filler mixtures in which the glass- and/or plastic-based globular particles make up at least 10% by volume and, more particular, about 30 to 80% by volume of the filler mixture are particularly suitable for the purposes of the invention. The filler mixture preferably contains 35 to 55% by volume of globular particles because a percentage content such as this provides for an optimal ratio of flexibility to firmness in the ready-to-use multipurpose adhesive surfacer.

Hollow beads are preferably present as the globular particles. They have the major advantage over solid beads of saving weight, i.e., the ready-to-use multipurpose adhesive surfacer has a distinctly lower density where hollow beads are used. In addition, hollow beads provide the cured adhesive surfacer with additional elasticity under compressive stress. Hollow beads having an average diameter of from about 10 to 150 $\mu$m have proved to be particularly suitable for the purposes of the invention. For high and very high demands on the cured surfacer and, at the same time, on the flexibility of the ready-to-use surfacer, it has proved to be of advantage for the hollow beads to have an average diameter in the range from 40 to 100 $\mu$m and preferably in the range from 50 to 70 $\mu$m.

In addition to considerably reducing the density of the adhesive surfacer and increasing its elasticity, the use of hollow beads leads to greater impact strength and increased flexural strength. The firmness of the surfacer before curing is also improved. For special applications, the use of hollow beads can have the advantage that it also improves other properties of the surfacer, including for example improved thermal and acoustic insulation, improved dielectric properties, and reduced water absorption. Hollow microbeads of borosilicate glass are particularly suitable for the purposes of the invention because the improvements described above can be obtained with them. In a preferred embodiment of the invention, a further reduction in density and a further improvement in firmness can be obtained by using hollow microbeads of thermoplastics. In addition, hollow plastic beads have the advantage that, where the cured multipurpose adhesive surfacer is machined, tool wear is considerably lower than in cases where hollow glass beads are used. Hollow microbeads based on polyvinylidene chloride (PVDC) are particularly preferred. Hollow microbeads of various glasses and also of various thermoplastics are well known to those skilled in the art, have long been commercially available, and are suitable for the purposes of the invention. Mixtures of hollow glass beads and hollow plastic beads may of course also be used.

In addition, the filler mixture may also contain other finely divided, optionally non-globular particles of inorganic material and/or plastics. Mineral substances, preferably coated mineral substances, are particularly suitable in this regard. The coating of finely divided mineral substances is known to the expert. In practice, fatty acids for example have proved to be suitable coating agents. Mineral substances thus coated may be processed far better with the other components of the multipurpose adhesive surfacer, for example may be introduced more easily into the polyol component (A). In addition, in contrast to non-coated mineral substances, they produce a rheological effect which leads to increased firmness of the surfacer. Chalk, especially coated chalk, is particularly suitable as the mineral substance. It has been found that a calcium carbonate precipitated from solution and coated with 2 to 3% by weight fatty acid as filler provides the surfacer with much better water resistance than a coated naturally occurring chalk. Accordingly, a freshly precipitated chalk is preferably used, particularly where the average size of the chalk particles is in the range from 0.5 to 1 $\mu$m.

In addition, polymer powders are suitable as optionally non-globular particles. Powders such as these, for example based on polyvinyl acetate, have long been known to those skilled in the art. Polyvinyl chloride (PVC) powders are particularly preferred for the purposes of the invention. In this case, too, the use of polymer-based fillers leads to a reduction in the density of the multipurpose adhesive surfacer and, where the cured surfacer is machined, to lower wear of the machining tools. Accordingly, the finely divided, optionally non-globular particles mentioned above may be both mineral substances and also plastics or combinations thereof.

One preferred embodiment of the adhesive surfacer contains a filler mixture in which a drying agent is present. As already mentioned, it is undesirable that the isocyanate component (B) react with water in order to avoid the formation of $CO_2$. Accordingly, the other components, particularly the polyol component (A) should be at least substantially anhydrous. This can be guaranteed by a drying agent known to those skilled in the art, for example calcium oxide. This applies in particular when the drying agent is at least partly present in the polyol component (A). A preferred drying agent is zeolite A at least partly freed from water of crystallization which preferably contributes up to 20% by weight of the filler mixture. Drying agents such as these are also known as molecular sieves. Accordingly, typical molecular sieves may be used as drying agents, particularly if their micropore diameter is of the order of 0.3 nm. So-called organic drying agents which react off with water, such as for example compounds from the class of oxazolidines, may also be present. The quantity and volume of the fillers of the filled polyol component (A) are preferably adapted so that a ratio of about 6:1 parts by volume of (A) to (B) gives the ready-to-use multipurpose adhesive surfacer where component (B) does not contain any fillers.

In one preferred embodiment, the reactive component (B) at least partly contains non-reactive components, including in particular the fillers. At least a proportion of the globular particles, particularly the hollow beads, is advantageously present in the reactive component (B). In a preferred version, the multipurpose adhesive surfacer is formulated in such a way that the reactive component (A) and the reactive component (B) respectively contain fillers in quantities which are selected so that a mixture of the filled components (A) and (B) in a ratio of about 3:1 to 1:1 parts by volume forms the ready-to-use multipurpose adhesive surfacer. It can be of advantage in this regard for component (B) to contain most of the globular particles, particularly where they are hollow beads. In the interests of user-friendly application, integral mixing ratios of parts by volume of (A) to (B) are preferred, such as for example 3:1, 5:2, 2:1, 3:2 or 1:1.

The multipurpose adhesive surfacer preferably contains typical reaction accelerators as a further additive. Suitable reaction accelerators are, for example, tertiary bases, such as bis-(N,N-dimethylamino)-diether, dimethylaminocyclohexane, N,N-dimethyl benzylamine, N-methyl morpholine and the reaction products of dialkyl-($\beta$-hydroxyethyl)-amine with monisocyanates and esterification products of dialkyl-($\beta$-hydroxyethyl)-amine and dicarboxylic acids. Another important accelerator is 1,4-diaminobicyclo-(2.2.2)-octane. Non-basic substances may also be used as accelerators. Organometallic compounds, for example of tin, mercury and/or bismuth, such as tin(II) (2-ethylhexoate) and dibutyl tin dilaurate, are preferably present as accelerators. Other suitable organometallic compounds are, for example, iron pentacarbonyl, nickel tetracarbonyl, iron acetyl acetonate and molybdenum glycolate. Among the organotin compounds, the dialkyl tin mercaptides are particularly preferred, inter alia for toxicological reasons, because they show particularly good reaction-accelerating properties in the surfacers according to the invention.

The multipurpose adhesive surfacers according to the invention advantageously contain other typical additives, including inter alia thickeners, antiagers, plasticizers, pigments, thixotropic agents, and/or UV absorbers. Stabilizers, flameproofing agents, retarders, and, optionally, solvents are also regarded as additives in the context of the invention. Suitable thickeners are, for example, typical inorganic thickeners, such as layer silicates, bentones, and/or montmorillonites. Suitable plasticizers are, for example, the alkyl sulfonic acid esters already mentioned. Suitable pigments are, for example, carbon black and titanium dioxide. Suitable thixotropic agents for isocyanate-containing systems are, for example, aromatic diamines which react with the NCO groups to form products which produce the thixotropicizing effect. Benztriazole, for example, may be used as a UV absorber.

The additives may be present in the polyol component (A) and/or in the isocyanate component (B). If component (B) contains fillers, particularly hollow beads, the thixotropicizing agents and/or thickeners are also preferably present in (B).

Since the multipurpose adhesive surfacer according to the invention is a two-component product which cures to a solid material after mixing of the reactive components (A) and (B) and after a variable pot life in which the compound remains processable, the two reactive components (A) and (B), together with the fillers and optionally additives incorporated therein, are stored separately from one another in the absence of water pending mixing and application. Packs impermeable to water vapor have proved to be particularly suitable for the storage of the two components and are therefore preferred. Water-impermeable packs include a number of shapes and materials, such as for example tin cans, metal or plastic tubes, and products sealed in films, or combinations of the possibilities mentioned. Preferred packs are resealable packs which enable the reactive components to be removed in portions. In addition, packaging materials which are impermeable to all the ingredients of the reactive components and which are not attacked and/or otherwise functionally impaired by any of those ingredients are particularly preferred.

The multipurpose adhesive surfacers according to the invention are used for filling and/or bonding wood, plastics, metals and/or other solid materials. As already described, the parameters of the adhesive surfacer, such as pot life, viscosity, etc., can be adjusted through the type and quantity of components present in such a way that optimal application is guaranteed at room temperature, i.e., at a temperature of 10° C. to 30° C. In individual cases, however, the adhesive surfacer may also be used at temperatures outside this range, providing the effect of temperature on the applicationally relevant parameters is taken into account.

The adhesive surfacer is particularly suitable for wood and wood materials. For example, old furniture can be effectively restored with the surfacer according to the invention. For example, broken joints can be put back together and bonded and, at the same time, any loss of material can be replaced. Gluelines up to several centimeters thick can be established. However, the surfacer may also be used solely to replace losses of material. Other materials can also be bonded with the multipurpose adhesive surfacer; for example, ceramic tiles may be bonded to plaster or to wood and the surfacer may also be used for grouting between the tiles. By means of the multipurpose adhesive surfacer, the materials mentioned can be durably bonded not only to materials of the same kind, but also to other materials mentioned. The multipurpose adhesive surfacer may also be used in building construction, for example as a plaster or mortar or as a levelling compound. The surfacer according to the invention may also be used in the laying of floor coverings, for example plastic flooring, for durably fixing the floor covering to the substrate. The multiple potential applications of the surfacer according to the invention and corresponding associated tests are described in the following in a few selected Examples.

EXAMPLES

All the following Examples according to the invention contain the following constituents in the polyol component (A):

| | |
|---|---|
| Sovermol ® POL 1080 V as component (A1) | 38.3 parts by weight |
| steamed castor oil as component A2) | 5.1 parts by weight |
| 2-octyl-1-dodecanol (technical) as component A3) | 1.7 parts by weight |
| Zeolite A as drying agent | 8.6 parts by weight |
| and catalytically active quantities of dialkyl tin mercaptide (0.0003 to 0.001 parts by weight). | | and catalytically active quantities of dialkyl tin mercaptide (0.0003 to 0.001 part by weight).

EXAMPLE 1

Additionally contains

| | |
|---|---|
| 43.3 | parts by weight of calcium carbonate precipitated from solution and coated with fatty acid |
| 3 | parts by weight of hollow borosilicate glass beads and was mixed with |

-continued

| 18 | parts by weight of technical MDI (NCO:OH ratio 1:1) |

EXAMPLE 2

Additionally contains

| 43.3 | parts by weight of calcium carbonate precipitated from solution and coated with fatty acid |
| 3 | parts by weight of hollow borosilicate glass beads and was mixed with |
| 19 | parts by weight of technical MDI (NCO:OH ratio 1.06:1). |

EXAMPLE 3

Additionally contains

| 46.3 | parts by weight of calcium carbonate precipitated from solution and coated with fatty acid and was mixed with |
| 18 | parts by weight of technical MDI (NCO:OH ratio 1:1). |

EXAMPLE 4

Additionally contains

| 20 | parts by weight of calcium carbonate precipitated from solution and coated with fatty acid |
| 23.3 | parts by weight of PVC powder, |
| 3 | parts by weight of hollow borosilicate glass beads and was mixed with |
| 18 | parts by weight of technical MDI (NCO:OH ratio 1:1). |

EXAMPLE 5

Additionally contains

| 45.67 | parts by weight of calcium carbonate precipitated from solution and coated with fatty acid, |
| 0.63 | parts by weight of hollow PVDC beads and was mixed with |
| 18 | parts by weight of technical MDI (NCO:OH ratio 1:1). |

In Examples 1 to 5 according to the invention, the fillers are incorporated in reactive component (A).

EXAMPLE 6

Additionally contains

| 46 | parts by weight of calcium carbonate precipitated from solution and coated with fatty acid in component (A). |
| 0.63 | part by weight of hollow PVDC beads and |
| 0.113 | parts by weight of an aromatic diamine (thickener) were incorporated in MDI to form a storable mixture (reactive component (B)). | were incorporated in MDI to form a storable mixture (reactive component (B)).

To obtain a ready-to-use multipurpose adhesive surfacer according to the invention, reactive components (A) and (B) were thoroughly mixed with one another.

COMPARISON EXAMPLE 1

Does Not Correspond to the Invention

Contains

| 48.77 | parts by weight of component (A1) (as above), |
| 3.06 | parts by weight of hollow borosilicate glass beads, |
| 4.38 | parts by weight of zeolite A powder as drying agent, catalytically active quantities of dialkyl tin mercaptide, and |
| 40.79 | parts by weight of a naturally occurring chalk coated with fatty acid and was thoroughly mixed with |
| 19.5 | parts by weight of technical MDI (NCO:OH ratio 1:1). | catalytically active quantities of dialkyl tin mercaptide, and 40.79 parts by weight of a naturally occurring chalk coated with fatty acid and was thoroughly mixed with 19.5 parts by weight of technical MDI (NCO:OH ratio 1:1).

COMPARISON EXAMPLE 2

Does Not Correspond to the Invention

Contains

| 45.1 | parts by weight of component (A1) (as above), |
| 43.3 | parts by weight of calcium carbonate precipitated from solution and coated with fatty acid, |
| 3 | parts by weight of hollow borosilicate glass beads, |
| 8.6 | parts by weight of zeolite A powder, and dialkyl tin mercaptide in catalytic quantities and was thoroughly mixed with |
| 17.93 | parts by weight of technical MDI (NCO:OH ratio 1:1). |

The following tests were carried out:

1. Evaluation of the adhesives for bonding wood and wood materials (DIN 68602)

To this end, wood specimens were bonded to one another in partly overlapping form. After storage under predetermined conditions, the test specimens were clamped in a tensile tester (Zwick) and loaded to destruction of the adhesive joint. The adhesives may be classified in various groups, depending on the preliminary storage and the measured load-bearing capacity. Thus, adhesives in group B3 are suitable for interior applications involving transient, but high humidity and brief periods of exposure to water and also for external application. Adhesives of group B4 are suitable for interior applications involving extreme climate variations and exposure to water (for example swimming pools, shower cubicles) and for external applications involving severe climatic effects. In accordance with this DIN specification, the heat resistance test is carried out at 90° C.

2. Tensile strength and elongation at break

To determine internal tensile strength and elongation at break, bone-shaped test specimens of the cured multipurpose adhesive surfacer were also clamped in the tensile tester and loaded to destruction (in accordance with DIN 53 504).

3. Shore D hardness

To determine the Shore D hardness, the penetration of a needle into a test specimen consisting of cured multipurpose adhesive surfacer is measured in accordance with DIN 53 505.

4. Mandrel bending test

A mandrel bending test was also carried out. To this end, the stirred surfacer is knife-coated in a defined layer thickness onto a 1 mm thick degreased steel plate measuring 5×20 cm. The test specimens are stored for 7 days at 40° C., subsequently conditioned at 20° C. and then bent through 180° around a 5 cm diameter mandrel. They were then evaluated for crack formation, peeling, etc.

A scale ranging from very good (=+++) to very poor (=− − −) was used in non-quantifiable tests, such as the mandrel bending test and the tests for miscibility, firmness, processability, and machinability.

The product Sovermol® POL 1080 V used as polyol component (A1) is a branched-chain polyol containing ester and ether groups with a Höppler viscosity of 4,200 mPas at 20° C., an average functionality of about 2.5 and an OH value of approximately 160 to 170. It has a saponification value of approximately 145, a flash point above 200° C. and an average equivalent weight of approximately 330 to 350.

for the bonding of plastic floor coverings to a plaster floor, wood and/or concrete;
for the bonding of decorative plastic-coated (DKS) chipboards to one another in the absence of pressure;
for the filling of holes in plaster and masonry;
for the bonding of foamed polystyrene, for example, insulating coverings or decorative panels on mineral substrates, such as wall and ceiling plaster with no mechanical fixing.

Soft and hardwoods bonded or repaired with the multipurpose adhesive surfacers according to Examples 1 to 6, which were treated with commercially available wood preservatives after curing of the surfacer, were exposed both to outdoor weathering and also to 700 hours of artificial weathering (xenon test). Thereafter, there was no sign of any significant change in the workpiece, i.e., the hardened surfacer did not separate from the substrate and does not itself show any change in volume or any sign of crumbling, flaking or cracking.

| Test | Examples (invention) | | | | | | Comparison Examples | |
|---|---|---|---|---|---|---|---|---|
| | 1 | 2 | 3 | 4 | 5 | 6 | 1 | 2 |
| Bond strength DIN 68602 B3 | 5.3 | 5.7 | 5.0 | 5.1 | 5.7 | 6.2 | <0.5 | 5.0 |
| Bond strength DIN 68602 B4 | 4.3 | 4.6 | 5.4 | 5.7 | 4.9 | 5.0 | 2.0 | 4.3 |
| Heat resistance according to DIN 68602 at 90° C. | 5.1 | 5.0 | 6.6 | 6.2 | 5.7 | 6.2 | 6.7 | 4.1 |
| Shore D hardness at 20° C. after 6 h | >10 | >10 | >10 | >10 | >10 | >10 | | |
| Shore D hardness at 20° C. after 24 h | >35 | >35 | >35 | >35 | >35 | >35 | | |
| Shore D hardness at 20° C. after 7 d | 63 | 66 | 69 | 61 | 62 | 64 | 64 | 64 |
| Mandrel bending test 1 mm | +++ | +++ | +++ | ++ | +++ | +++ | + | +++ |
| Mandrel bending test 2 mm | +++ | ++ | ++ | − | +++ | + | − − − | − |
| Miscibility (A) + (B) | + | + | − | 0 | + | +++ | +++ | − − |
| Firmness | + | + | 0 | 0 | + | ++ | − − − | + |
| Processability | + | + | 0 | + | + | ++ | +++ | − − |
| Machinability | + | + | − | ++ | ++ | +++ | − − | 0 |

All strength values are expressed in units of N/mm². The Shore hardness is dimensionless.

All the Examples according to the invention
have a pot life of about 10 to 20 minutes,
were sufficiently dry to be handled and machined after a cure time of 6 hours,
had a tensile strength or shear strength at 20° C. of at least 1 N/mm² after a cure time of 3 hours and at least 3 N/mm² after a cure time of 6 hours,
had a tensile strength of at least 10 N/mm² and an elongation at break of at least 10%,
were volume-stable, i.e., underwent no shrinkage or expansion during curing,
could be colored with inorganic pigments (iron oxides and/or carbon black),
could readily be coated with the following paints
polyurethane paints (one- and two-component),
acrylate paints,
alkyd resin paints,
nitro lacquers and
epoxy paints.

In addition, the wood adhesive surfacers of Examples 1 to 6 according to the invention were used with very good results for the following applications:
for repairing broken door hinges on cupboard doors;
for restoring old furniture (filling and bonding of cracks, replacement of losses of material);
as a replacement material for rotten or worm-affected parts of wooden window frames and door frames, particcularly outdoor types;
for the bonding of tiles to wood and/or mineral substrates;

Wood parts repaired with the multipurpose adhesive surfacers according to the invention could readily be machined at the repaired or filled places by such methods as sawing, milling, grinding, drilling, rasping, planing, cutting, and/or thread cutting.

In addition, the following substrates were bonded to one another using the multipurpose adhesive surfacers of Examples 1 to 6 according to the invention: copper/copper; zinc/zinc; aluminum/aluminum; and steel/steel. All the bonds showed shear strengths of >15 N/mm².

In addition, the following substrates were bonded to one another: polycarbonate/polycarbonate; rigid PVC/rigid PVC; flexible PVC/flexible PVC; glass/glass; acrylic sheet/acrylic sheet; and phenolic resin/phenolic resin. All the bonds had shear strengths of >5 N/mm².

What is claimed is:

1. Two-component polyurethane adhesive surfacers consisting of a polyol component (A) and a polyfunctional isocyanate component (B), wherein:
(I) component (A) is liquid at room temperature and consists essentially of fillers and constituents containing isocyanate-reactive hydroxyl groups, and, optionally, one or more additives selected from the group consisting of drying agents, reaction accelerators, thickeners, antiagers, plasticizers, pigments, thixotropic agents, UV absorbers, stabilizers, flameproofing agents, retarders, and solvents, said constituents containing isocyanate-reactive hydroxyl groups comprising:

(A1) an at least predominant content of branched-chain polyols containing ester and ether groups;

(A2) glycerol esters which are liquid at room temperature and have an OH functionality of at least 2 to about 3 and which are esters of long-chain, optionally olefinically unsaturated, and at least predominantly OH-substituted fatty acids; and, optionally, (A3) low-viscosity monofunctional alcohols of distinctly oleophilic character, which are at least substantially involatile at room temperature;

(II) component (B) consists essentially of polyfunctional isocyanates, and optionally, fillers, and, optionally, one or more additives selected from the group consisting of drying agents, reaction accelerators, thickeners, antiagers, plasticizers, pigments, thixotropic agents, UV absorbers, stabilizers, flameproofing agents, retarders, and solvents;

(III) the total weight of fillers in components (A) and (B) is from 40 to 70% of the sum of the weight of the constituents containing isocyanate-reactive hydroxyl groups in component (A) and the total weight of fillers in components (A) and (B); and (IV) the mixture of components (A) and (B) produces a mixture that can be shaped immediately after mixing but which sets upon standing to a substantially waterproof elastic solid.

2. Adhesive surfacers as claimed in claim 1, wherein component (A1) is selected from the group consisting of branched-chain polyols containing ester and ether groups, component (A1) as a whole having a viscosity of from about 3,000 to 5,000 mPas at 20° C. and an OH value of 120 to 200.

3. Adhesive surfacers as claimed in claim 2 which contain castor oil having an OH functionality of about 2.5 to 3 as component (A2).

4. Adhesive surfacers as claimed in claim 3, wherein branched alkanols containing at least 12 carbon atoms are present as component (A3), which has a viscosity at 20° C. of 30 to 250 mPas.

5. Adhesive surfacers as claimed in claim 4, wherein component (A3) consists of 2-octyl-1-dodecanol.

6. Adhesive surfacers as claimed in claim 3, wherein the ratio by weight of (A1) to (A2) is from 10:1 to 5:1.

7. Adhesive surfacers as claimed in claim 4, wherein the monofunctional alcohols (A3) are present in a ratio of {(A1)+(A2)} to (A3) in the range from 90:10 to 99:1.

8. Adhesive surfacers as claimed in claim 7, wherein the isocyanate component (B) has a functionality of from 2.3 to 2.5

9. Adhesive surfacers as claimed in claim 8, wherein the isocyanate component (B) is an isomer mixture containing diphenyl methane-4,4'-diisocyanate (MDI) as principal component.

10. Adhesive surfacers as claimed in claim 9, which contain components (A) and (B) in quantities which correspond to a molar ratio of NCO to OH groups of 100:100 to 110:100.

11. Adhesive surfacers as claimed in claim 1 which contain hollow globular borosilicate glass, PVDC plastic, or both borosilicate glass and PVDC plastic microbeads with an average diameter in the range from 50 to 70 μm as about 35 to 55% of the total volume of fillers after mixing components (A) and (B).

12. Adhesive surfacers as claimed in claim 1 which contain non-globular PVDC polymer powders based on PVC.

13. Adhesive surfacers as claimed in claim 1 which contain calcium carbonate precipitated from solution and coated with fatty acid, with an average particle size of 0.5 to 1 μm.

14. Adhesive surfacers as claimed in claim 1 which contain zeolite A at least partly freed from water of crystallization as a drying agent as part of the filler, the amount of zeolite A being not more than 20% by weight of the total amount of filler.

15. Adhesive surfacers as claimed in claim 1, wherein component (A) and component (B) each contain fillers and a mixture of components (A) and (B) in a ratio of approximately 3:1 to 1:1 parts by volume forms the ready-to-use multipurpose adhesive surfacer.

16. Adhesive surfacers as claimed in claim 1 which contain organometallic compounds of tin, mercury, bismuth, or mixtures of any two or more of these metals as an additive.

17. Adhesive surfacers as claimed in claim 16 which contain dialkyl tin mercaptides.

18. Adhesive surfacers as claimed in claim 1 which contain additives selected from the group consisting of thickeners, antiagers, plasticizers, pigments, thixotropic agents, and UV stabilizers.

19. Adhesive surfacers as claimed in claim 1, in the form of two packages impermeable to water vapor, one of which packages contains all of component (A) and the other of which contains all of component (B).

20. A process of filling, bonding, or both filling and bonding solid materials with an adhesive prepared by mixing components (A) and (B) of an adhesive according to claim 1.

* * * * *